(12) United States Patent
Ibos et al.

(10) Patent No.: US 11,522,973 B1
(45) Date of Patent: Dec. 6, 2022

(54) DATA MANAGEMENT SYSTEM

(71) Applicant: ADP, Inc., Roseland, NJ (US)

(72) Inventors: Pierre Ibos, Blagnac (FR); Nicolas Mata, Nanterre (FR); Sébastien Nozières, Nanterre (FR); Lise Mas, Nanterre (FR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 17/303,168

(22) Filed: May 21, 2021

(51) Int. Cl.
*H04L 67/566* (2022.01)
*H04L 67/02* (2022.01)
*H04L 67/565* (2022.01)
*H04L 67/568* (2022.01)

(52) U.S. Cl.
CPC ............ *H04L 67/566* (2022.05); *H04L 67/02* (2013.01); *H04L 67/565* (2022.05); *H04L 67/568* (2022.05)

(58) Field of Classification Search
CPC ... H04L 67/566; H04L 67/565; H04L 67/568; H04L 67/02
See application file for complete search history.

(56) References Cited

U.S. PATENT DOCUMENTS

| | | | | |
|---|---|---|---|---|
| 2017/0301013 A1* | 10/2017 | Alejo | .................. | G06Q 40/025 |
| 2019/0394285 A1* | 12/2019 | Kalaimalai | ............. | H04L 67/01 |
| 2022/0198283 A1* | 6/2022 | Patodia | ................ | G06K 9/6282 |

\* cited by examiner

*Primary Examiner* — Wing F Chan
*Assistant Examiner* — Billy H Ng
(74) *Attorney, Agent, or Firm* — Yee & Associates, P.C.

(57) ABSTRACT

A method for automating data management is provided. The method comprises receiving an input to initiate generation of a data management request related to an application object, wherein a number of predefined data management operations are configured for the application object. Responsive to receiving the input, identify an application associated with the application object using association information that identifies a number of application objects for the application. Generating a data management request to initiate a number of data management operations on the application object in the application, wherein all data management requests generated comprises a generic format for all application objects.

23 Claims, 5 Drawing Sheets

DATA MANAGEMENT SYSTEM

BACKGROUND INFORMATION

1. Field

The present disclosure relates generally to an improved computer system, and more specifically to managing data in an application by allowing users to define custom forms to connect end users to automation scripts.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs using an employee information system. An information system may also be used to determine when to hire new employees, assign employees to projects, perform reviews for employees, and other suitable operations for the organization. A research department in the organization may use an information system to store and analyze information to research new products, perform reviews of employees, hire new employees, analyze products, or for other suitable operations.

File transfer is another area of information technology, it refers to the programmatic transmission of a computer file through a communication channel from one computer system to another. Almost all businesses have data they need to exchange with business partners, suppliers, and customers. However, a secured file transfer is difficult to achieve in large scale when those entities are across different industry sectors.

Therefore, it would be desirable to have a method and apparatus that take into account at least some of the issues discussed above, as well as other possible issues. For example, it would be desirable to have a method and apparatus that automate data management process.

SUMMARY

An illustrative embodiment provides a computer implemented method to automate data management, the method comprising using a computer system to perform the steps of receiving an input to initiate generation of a data management request related to an application object, wherein a number of predefined data management operations are configured for the application object. Responsive to receiving the input, identifying an application associated with the application object using association information that identifies a number of application objects for the application. Generating a data management request to initiate a number of data management operations on the application object in the application, wherein all data management requests generated comprises a generic format for all application objects.

Another illustrative embodiment provides a system for automating data management. The method comprising using a computer system to perform the steps of receiving, by a webserver, an input to initiate generation of a data management request related to an application object, wherein a number of predefined data management operations are configured for the application object. Responsive to receiving the input, identifying, by the webserver, an application associated with the application object using association information that identifies a number of application objects for the application. Generating, by the webserver, a data management request to initiate a number of data management operations on the application object in the application, wherein all data management requests generated by the webserver comprises a generic format for all application objects.

Another illustrative embodiment provides a computer implemented method to automate data management, the method comprising using a computer system to perform the steps of receiving an input to initiate generation of a data management request related to an application object, wherein a number of predefined data management operations are configured for the application object; retrieving a number of data management request templates; filling the number of data management request templates based on the input to generate a number of data management requests; identifying an application associated with the application object using association information that identifies a number of application objects for the application; and sending the number of data management requests to initiate a number of data management operations on the application object in the application, wherein data management requests comprises a generic format for all application objects.

Another illustrative embodiment provides a data management system comprising a request server configured to receive an input to generate a number of data management requests related to an application object and identify an appropriate application to perform a number of data management operations configured for the application object; and a database server in communication with the request server, configured to store a number of predefined data management operations associated with the application object and the application.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that manual data management may be more cumbersome and time-consuming than desirable. The illustrative embodiment recognizes and take into account that current automated file transfer systems lack a tool to connect the end users with the automated processes, and manually receiving requests through a ticketing tool can be time consuming and prone to human errors.

The illustrative embodiments also recognize and take into account that current file transfer technology is dependent on a particular system without the potential to be customized.

The illustrative embodiments provide a customizable tool for automating data management that can be used with any system. A data management request targeting a particular object is received by a request server that communicates with a database server. The database server contains all information related to the objects and relationship between different components of the system. The request server identifies an appropriate application based on information stored in the database server and sends an output to the identified application to manage the objects within the identified application.

Figure 1:
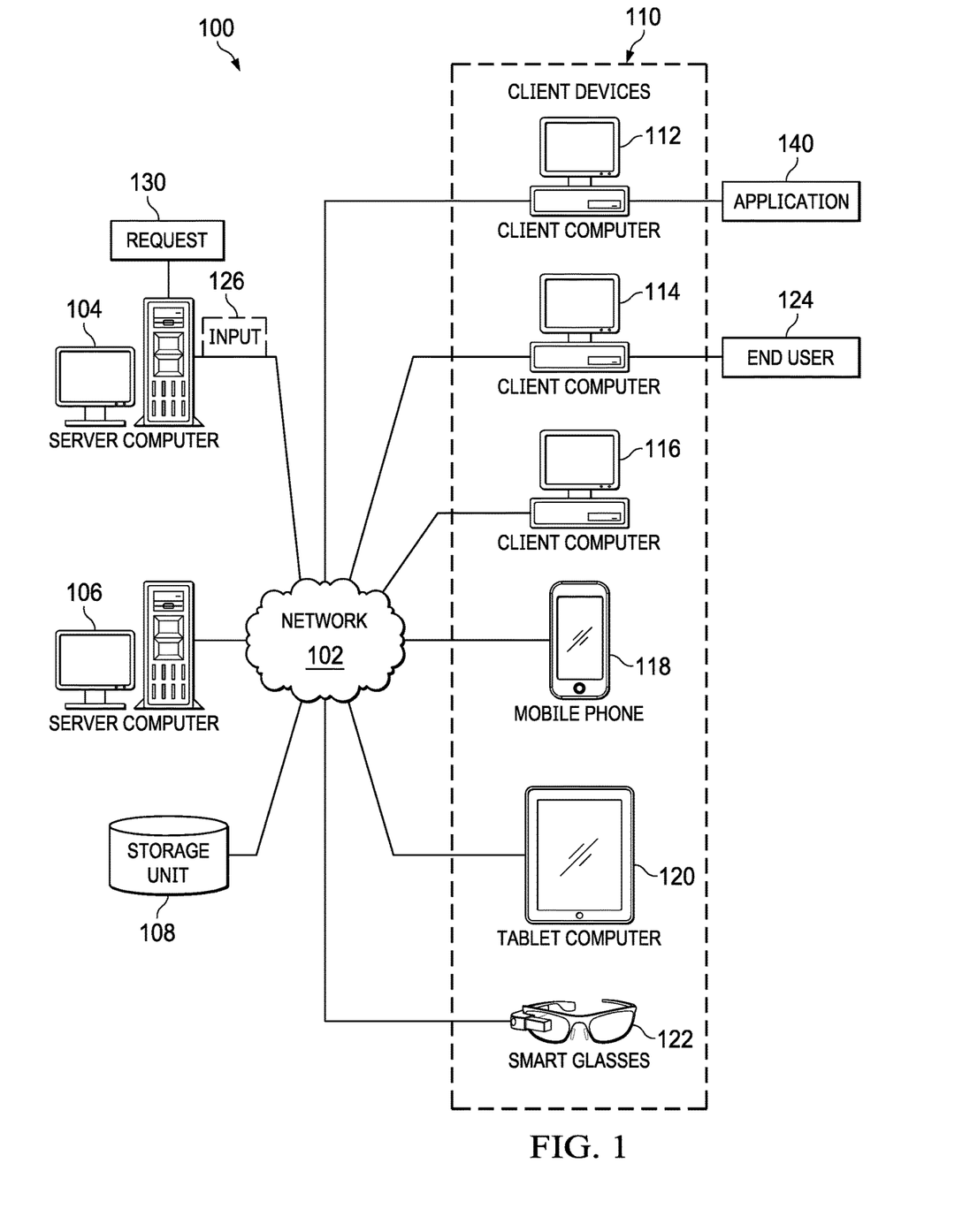
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative example, a "number of" when used with reference to items means one or more items. For example, a number of different types of networks is one or more different types of networks.

In this illustrative example, request 130 is a data management request generated by server computer 104 upon receiving an input 126 from the client computer 114 operated by an end user 124. In this illustrative example, end user 124 may be a person operating one of the client devices 110, for example, client computer 114 or an application 140 running on client computer 114. Here, the server computer 104 may receive the input 126 from end user 124 through a representational state transfer (REST) interface. In this illustrative example, the end user 124 may submit input 126 through a web interface first, or directly to server computer 104 through the REST interface.

In some illustrative examples, the server computer 104 is in communications with server computer 106. In this example, server computer 104 is a request server such as a webserver configured to receives and transmit data, while server computer 106 is a database server configured to store information related to the application 140. It should be understood that the illustrative example is only one embodiment of current disclosure, the server computers may be hardware servers, or software servers running on a computer or a virtual environment. Server computer 104 and server computer 106 can also be configured to perform any desirable functions. For example, the server computers 104, 106 can be one of a web server, database server, or proxy server.

In some illustrative examples, request 130 can initiate a number of data management operations to be performed on an application running on a device. The application may be application 140 running on client computer 114, or an application running on a different device, such as a client computer or a server. In this illustrative example, the server computer 104 can be configured to identify which application is appropriate to route the request 130 upon reception of the input 126. In some illustrative examples, the request 130 can be transmitted to a proxy server first for data format translation.

Figure 2:
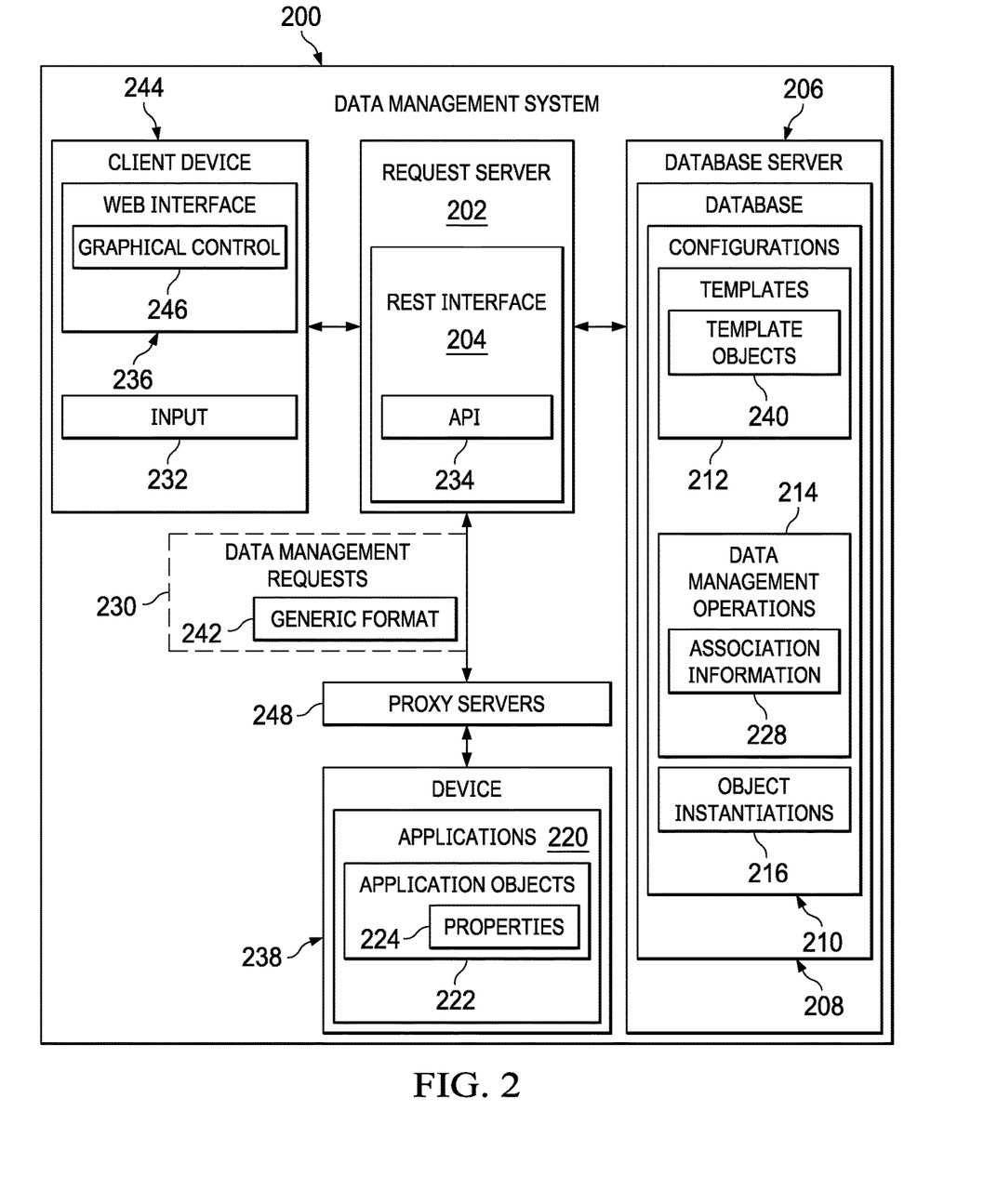
FIG. 2 is a block diagram of a data management system in accordance with an illustrative embodiment.

FIG. 2 is a block diagram of a data management system depicted in accordance with an illustrative embodiment. Data management system 200 might be implemented in network data processing system such as network data processing system 100 shown in FIG. 1.

In this illustrative example, the data management system 200 includes a request server 202. Request server 202 can be configured to receive an input 232 from an end user, for example, from a client device 244 through a web interface 236 or an application. In this illustrative example, input 232 contains information to initiate generation of data management requests 230. The input 232 may be generated by a graphical control 246 selected by the end user through a web interface 236 using an input device such as mouse, keyboard or touchscreen, or a command entered by the end user.

Input 232 is recognized by the request server 202. Request server 202 can also provide a representational state transfer (REST) interface 204 to receive input 232. In some illustrative examples, the end user can submit the input 232 directly to the request server 202 through a number of APIs (application program interface) 234. In another illustrative example, the end user can submit input 232 via web interface 236 first. The web interface 236 can be configured to retrieve, create, update, and check the input 232. In this illustrative example, the request server 202 can be any suitable server that can be configured to receives input data, for example, a web server.

Data management system 200 includes a number of applications 220 running on a device 238. Device 238 can be any suitable device, such as an internal device running on the local network or an external device connecting to other components of data management system 200 via internet. Applications 220 can be any application running on a backend server used by an end-user. For example, applications 220 can be a technical application, payroll application, an employee management application, or a workflow application. Applications 220 are associated with a number of application objects 222. Application objects 222 can be at least one of program code or information for an application. For example, application objects 222 can be an application, program code run by the application, information accessed by the application, information used by the application, a firewall, a dataset, a software system, an application system, a security system, a policy, a software policy, a security policy, a firewall policy, or some other type of information or program code, or both information and program code that can be part of used by the application.

Application objects 222 can be managed upon receiving data management requests 230 generated by the request server 202. In some illustrative examples, one data management request from data management requests 230 may be configured to manage one application object from application objects 222 in applications 220. In this illustrative example, application objects 222 can be any type of software. A software can be a firewall, a dataset, a software system such as application system or security systems, or policies such as software policy, security policy, or firewall policy.

An application object in the number of application objects 222 can have a number of properties 224 linked to each application object in the number of application objects 222. In this illustrative example, properties 224 have predefined property values, which are the attributes that describe application objects 222. Properties 224 can further be classified into different types. For example, properties 224 can be values such as free text or value from a list (e.g., first name and last name for a person); a computed value that is calculated based on other value (e.g., full name is computed by combining first name and last name for a person); an existing object that links to an object that is already created in the system (e.g., property "team member" of object "team" is linked to an instantiation of object "person" already created in the system); an inherited value that comes from a property of existing property of object (e.g., property "manager name" is inherited from property "name" of object "person"); a new object that is a property linked to an object created during the objection creation (e.g., property "manager" is linked to both object "team" and object "person" while object "team" and object "person" are created at the same time); a hidden value that is only used for configuration processing; a duplicate value which is a copy of a property of same object; or a datasource value that comes from an external data repository (e.g., a list of external servers).

In this illustrative example, properties 224 can also be dynamic properties that depend on values of other properties in properties 224. In some illustrative examples, properties 224 can be organized into logical groups and linked to application objects 222 by a group holder component.

In this illustrative example, the data management requests 230 are requests related to one of application objects 222 and are generated by the request server 202 based on input 232 from the end user. Data management requests 230 may be a query, request for action, or any data or information that will trigger an action or initiate the data processing. Data management requests 230 contains information includes application objects, properties corresponding to the application objects, property values for the properties, information regarding what type of data management operations should be performed on the application objects, which application objects the end user wants the perform data management operations on, and User ID of the end user.

Data management system 200 also includes a database server 206 in communication with request server 202. Database server 206 further includes a database 208. Within the database 208 is a number of configurations 210 and a number of object instantiations 216. In this illustrative example, configurations 210 further includes a number of templates 212 to help end users efficiently create a data management request with multiple objects. Templates 212 are designed with several template objects 240 attached to them. For each property of template objects 240 attached to templates 212, there is a hardcoded value or rule of how to compute the value of the property at runtime based on the property value provided by the end user. In this illustrative example, when an input 232 with limited information is received by request server 202, the request server 202 will select one of templates 212 based on the information given by the end user and then compute the values of properties for each template objects 240 contained in the selected data management template. For example, when an end user only provides his client ID as input, which is insufficient to generate a data management request on its own, the request server 202 will retrieve one of templates 212 from database server 206 and calculate each property of the template objects 240 based on the client ID provided and computation rule embedded in the selected template.

Configuration 210 also includes a number of data management operations 214. In this illustrative example, an application object related data management requests 230 generated by the request server 202 initiates at least one of data management operations 214 on the application objects 222 in applications 220. Data management operations 214 can be predefined and can include information of data management operations that may be performed to the application objects 222, such as, e.g., data deletion, data creation, data update, data validation, or data verification. Some practical examples can be password reset, account creation, or database schema cloning. Data management operations 214 can also include association information 228 between application objects and applications.

Association information 228 describes a set of application objects used by an application. For example, the set of application objects can be selected from at least one of an application programing interface, a configuration file, a data file, a dynamic link library, or other application object used by the application when the application runs. The application can perform at least one of access, edit, delete, or perform other operation on the application object when using the set of application objects.

Association information 228 may also contain information related to the relationship between applications 220 and application objects 222. For example, the relationship may be related to which application object is used by which application, or other information that describes the computational rules on how to identify appropriate applications from applications 220 to route the data management requests 230.

In this illustrative example, association information 228 helps the request server 202 to identify applications 220 to send the data management requests 230. In some illustrative examples, request server 202 first retrieves association information 228 from data management operations 214 in database 208 and computes to which applications 220 to send the data management requests 230 based on the input 232 and computational rule embedded in association information 228.

In addition, configuration 210 can include a number of object instantiations 216. Object instantiations 216 contain all information related to the application objects 222 and their corresponding properties. In some illustrative examples, properties, dynamic properties, and information related to the values of application objects 222 are stored in object instantiations 216 after application objects 222 are defined by configuration 210. In this illustrative example, application objects 222 can be instantiated as a request or a referential entry. Those requests and referential entries are then associated together to keep the history of the object instance. In some illustrative examples, the number of object instantiations 216 can include information related to object value, property values and association information between components, objects, properties, component properties, component dynamic properties, object properties, object dynamic properties, object value, property value, and dynamic property values. In this illustrative example, the object instantiation 216 is also configured to help the identification of matching between application object 222 and property 224.

Data management system 200 further includes a number of proxy servers 248 to serve as an intermediate between request server 202 and applications 220. In this illustrative example, request server 202 generates a data management requests 230 only in a generic format 242 for all application objects 222 and sends the data management requests 230 to proxy servers 248 after identifying an appropriate application from applications 220 to route the data management operation.

In this illustrative example, generic format 242 can be any predefined data format or file format used to encode information. For instance, generic format 242 can be JSON format, HTML format, CSV format, or XML format.

Upon receiving the request, the proxy servers 248 can translate the request from the generic format into a data format that is acceptable to the applications 220 identified by the request server 202. In some illustrative examples, the proxy servers 248 may be external proxy servers or an internal proxy server that runs on a local network. In this illustrative example, one proxy server may be configured to communicate with a number of applications from applications 220.

In this illustrative example, data management system 200 can be implemented in software, hardware, firmware, or a combination thereof. When software is used, the operations performed by data management system 200 can be implemented in program code configured to run on hardware, such as a processor unit. When firmware is used, the operations performed by data management system 200 can be implemented in program code and data and stored in persistent memory to run on the processor unit. When hardware is employed, the hardware may include circuits that operate to perform the operations in data management system 200. For example, hardware can be implemented within a set of processor units or processes performed by data management system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Client device 244, request server 202, database server 206, proxy servers 248, and device 238 in data management system 200 might each include a number of processor units (not shown). As used herein, a processor unit is a hardware device and is comprised of hardware circuits such as those on an integrated circuit that respond and process instructions and program code that operate a computer. When a number of processor units execute instructions for a process, the number of processor units is one or more processor units that can be on the same computer or on different computers. In other words, the process can be distributed between processor units on the same or different computers in a computer system. Further, the number of processor units can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
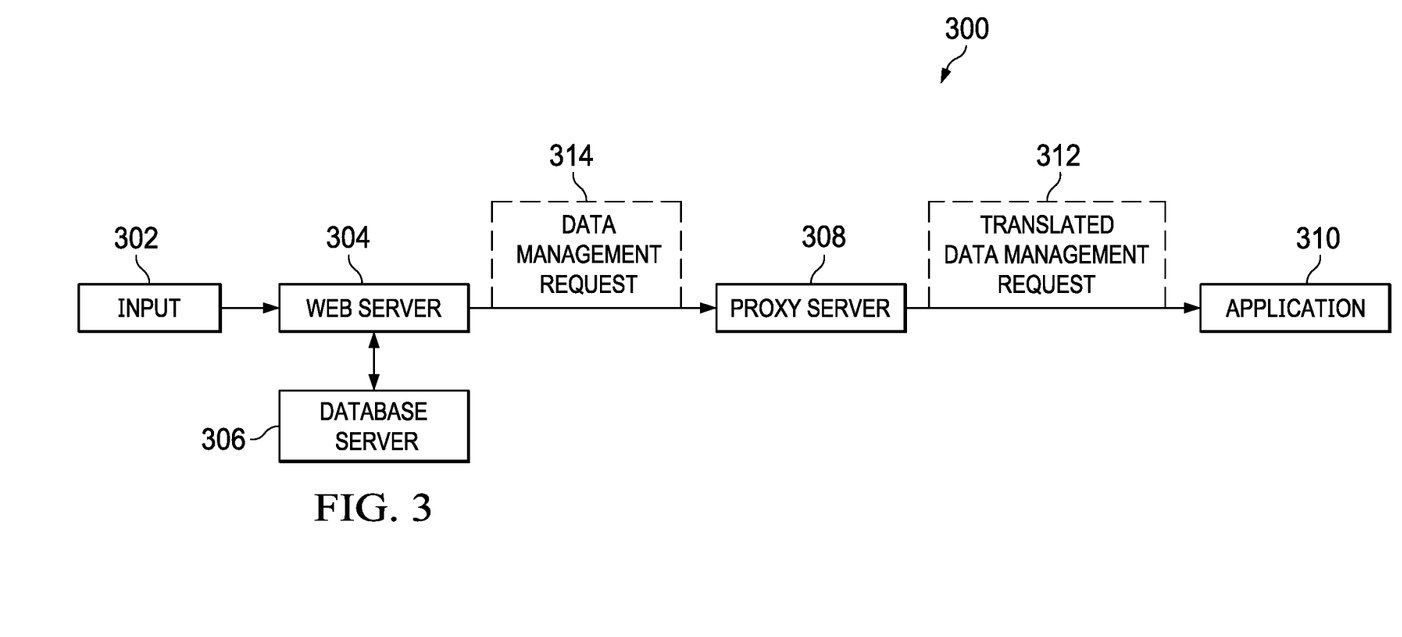
FIG. 3 is a data flow diagram illustrating data flow in accordance with an illustrative embodiment.

With reference next to FIG. 3, a data flow diagram to illustrate how information is transmitted through data management system 200 is depicted in accordance with an illustrative embodiment. The data flow 300 starts by submitting an input 302 to a web server 304. As depicted above, the input 302 can be submitted by a client through a web interface or by an application directly through a REST interface. Web server 304 then communicates with a database server 306 and retrieves necessary information to select an appropriate application 310 on which to perform a number of data management operations initiated by the data management request 314. As depicted above, Web server 304 then generates a data management request 314 in a generic format and transmits it to a proxy server 308. Upon receiving the data management request 314, proxy server 308 may translate the request into a data format that is acceptable to application 310. The proxy server 308 then sends the translated data management request 312 to application 310, and application 310 will perform the data management operation on its objects based on the translated data management request 312. It should be understood that the illustrated data flow is only one embodiment of the present disclosure. For example, a translation process may not be performed if the data management request 314 is already in a data format acceptable to the application 310. Furthermore, the web server 304 is only one possible embodiment of request server 202 depicted in data management system 200.

Figure 4:
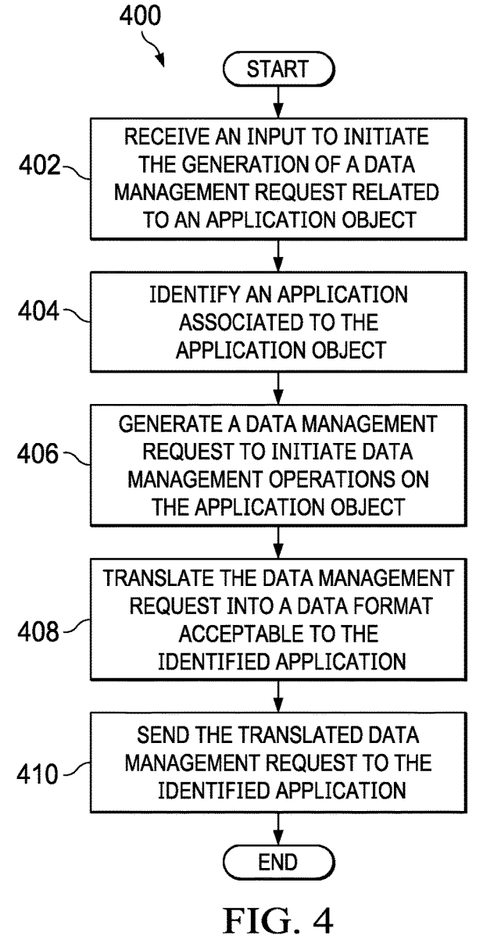
FIG. 4 is a flowchart of a process for managing data in accordance with an illustrative embodiment.

FIG. 4 depicts a flowchart illustrating a process for data management automation in accordance with an illustrative embodiment. Process 400 can be implemented in hardware, software, or both. When implemented in software, the process can take the form of program code that is run by one or more processor units located in one or more hardware devices in one or more systems. Process 400 might be implemented in the data management system 200 in FIG. 2.

Process 400 begins by receiving an input to initiate the generation of a data management request related to an application object (Step 402). As depicted above, the input can be submitted by a client or application either directly to a request server through a REST interface, or through a web interface.

Process 400 then identifies an application associated with the object (Step 404). In this illustrative example, the request server will communicate with a database server to retrieve information necessary to determine which application is appropriate to perform a number of data management operations requested by the input. As depicted above, the database server is configured to store information related to data management operations, association information between objects and application, object instantiations, and data management request templates.

A data management request to initiate a number of data management operation is then generated (Step 406). In this illustrative example, all data management requests generated include a generic format for all applications objects. The data management request is then translated into a predefined data format that is acceptable to the application (Step 408). As depicted above, the data management request can be translated by an external proxy server or an internal server running on the local network.

Process 400 sends the translated data management request to the application identified by the request server (Step 410). In this illustrative, a number of data management operations will then be performed on the objects of interest in the identified application. Process 400 terminates thereafter.

Figure 5:
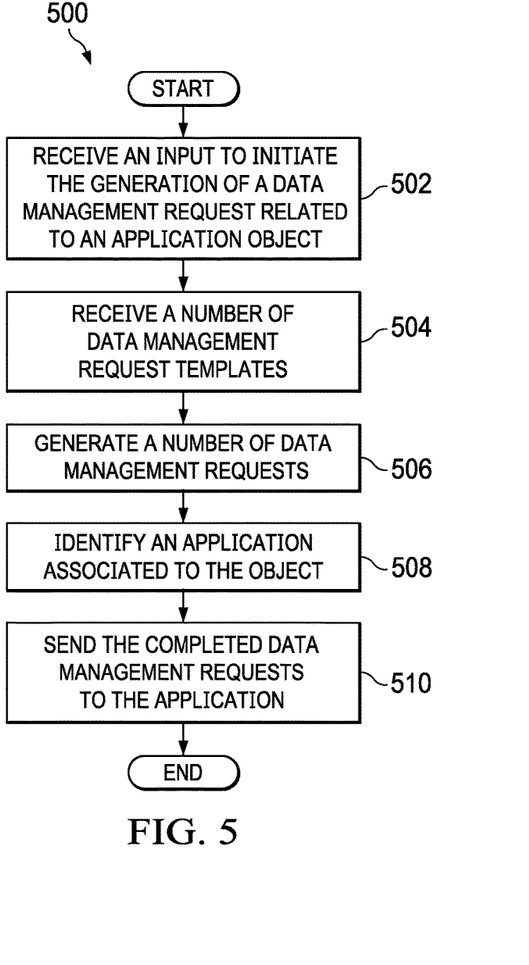
FIG. 5 is a flowchart of a process for managing data with template feature in accordance with an illustrative embodiment.

FIG. 5 depicts a flowchart illustrating a process for data management automation in accordance with an illustrative embodiment. Process 500 can be implemented in hardware, software, or both. When implemented in software, the process can take the form of program code that is run by one or more processor units located in one or more hardware devices in one or more systems. Process 500 might be implemented in the data management system 200 in FIG. 2.

Process 500 begins by receiving an input to initiate the generation of a data management request related to an application object (Step 502). In this illustrative example, the input may only contain limited information entered by an end user. For example, only a full name is provided by the end user with the input.

Process 500 then receives a number of data management request templates (Step 504). In some illustrative examples, an input from end user may initiate process 500 to retrieve only one data management request template. As depicted above, the data management requests templates and their corresponding configurations may be stored in a database server. The data management request templates are designed with several application objects attached to them. For each property of each application object attached to the data management request template, a configuration of a hard-coded value or rule of how to compute the value of the property at runtime based on the property value given is provided. In this illustrative example, process 500 may ask the database server what property values are needed from the end user to generate a data management request and retrieve such information from the end user.

Process 500 generates a number of data management requests by calculating each property for each application object in the retrieved data management request templates (Step 506). In this illustrative example, the calculation of each property may be based on the configurations of data management request templates and end user input. An appropriate application associated with the object is identified based on the user input and other information related to application stored in the database server (Step 508).

Process 500 then sends the data management requests to the identified application (Step 510). As depicted above, a number of data management operations will be performed on the objects upon receiving the data management request. In some illustrative examples, a status for each data management request sent to the application may be returned to the end user who sends the input. The status may be a pass/fail indicator that shows if the number of data management operations are successfully performed or not. The status may also show which data management operation is successfully perform and which is not if multiple data management operations are performed. Further, a recovery process may be triggered if at least one data management operation has failed. For example, the generated data management request may be resubmitted to the applications, and only the failed data management operations will be performed again. Process 500 terminates thereafter.

Figure 6:
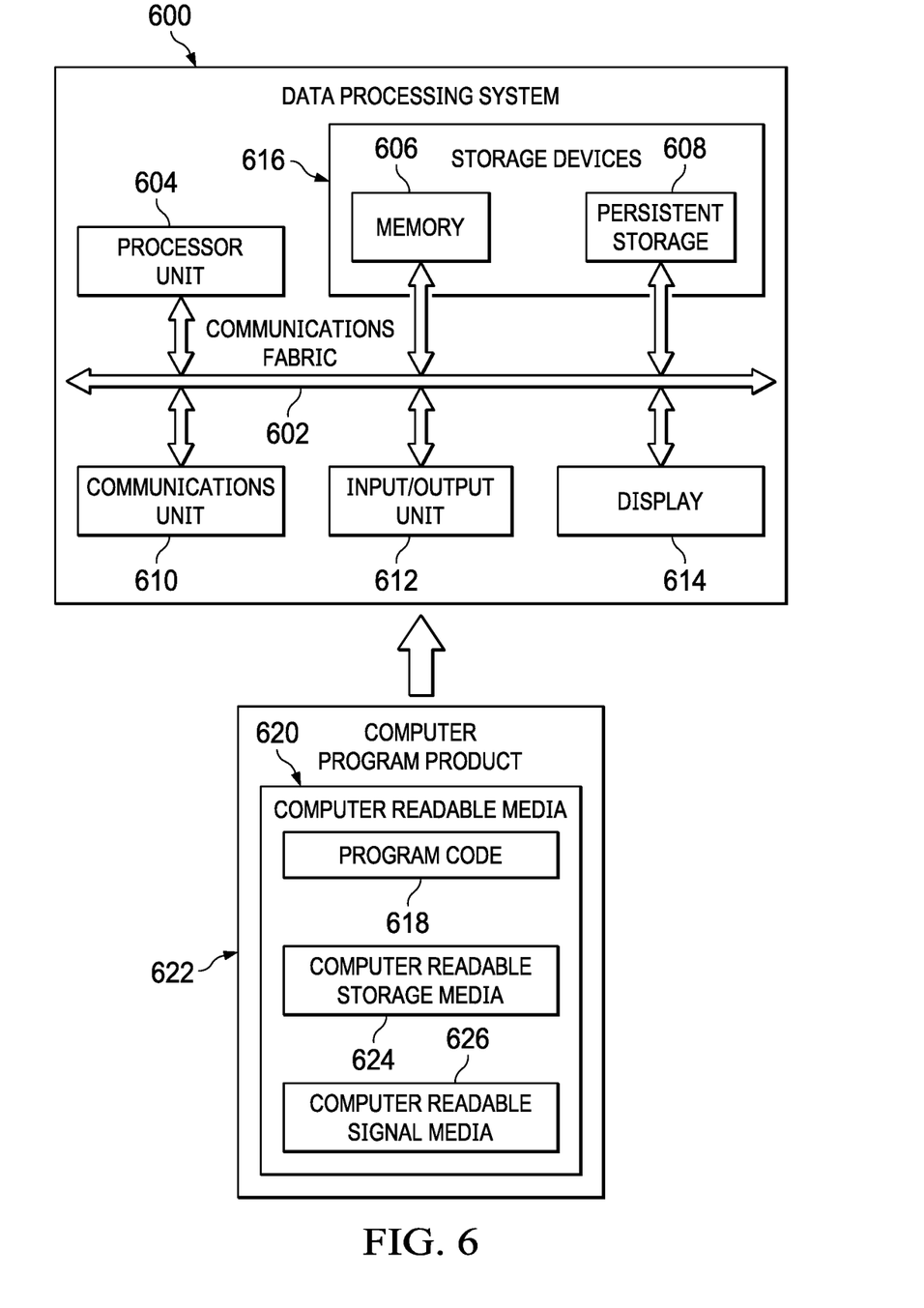
FIG. 6 is a block diagram of a data processing system in accordance with an illustrative embodiment.

Turning now to FIG. 6, an illustration of a block diagram of a data processing system is depicted in accordance with an illustrative embodiment. Data processing system 600 may be used to implement server computer 104 and server computer 106 and client devices 110 in FIG. 1, as well as client device 244, request server 202, database server 206, proxy servers 248, and device 238 in data management system 200 in FIG. 2. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (CPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Computer readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method to automate data management, the method comprising:
    using a computer system to perform steps of:
        receiving, an input to initiate generation of a data management request related to an application object, wherein a number of predefined data management operations are configured for the application object;
        responsive to receiving the input, identifying an application associated with the application object using association information that identifies a number of application objects for the application; and
        generating the data management request to initiate the number of predefined data management operations for the application object in the application, wherein all data management requests generated comprises a generic format for all application objects.

2. The method of claim 1, further comprising:
    translating, by a proxy server, the data management request into a predefined data format, wherein the predefined data format is acceptable to the application; and
    sending, by the proxy server, the translated data management request to the application.

3. The method of claim 1, wherein the input to initiate the generation of a data management request is received via a web interface or directly through a REST API call.

4. The method of claim 1, wherein the number of predefined data management operations comprise the association information between the application objects and the applications.

5. The method of claim 1, wherein the number of predefined data management operations comprise a number of predefined properties associated with the application object.

6. The method of claim 5, wherein the predefined properties comprise dynamic properties that depend on values of other properties.

7. The method of claim 5, wherein the predefined properties are organized into logical groups.

8. The method of claim 5, wherein the predefined properties associated with the application object comprises at least one of:
    value;
    computed value;
    inherited value;
    new object;
    hidden value;
    duplicate value;
    datasource value; or
    existing object.

9. The method of claim 1, wherein the input and the generated data management request are in JavaScript Object Notation (JSON) format.

10. The method of claim 1, wherein generating the data management request comprises:
    retrieving a number of data management request templates;
    filling the number of data management request templates based on the input to generate a number of data management requests; and
    sending the number of data management requests to initiate a number of data management operations on the application object in the application.

11. A computer-implemented method to automate data management, the method comprising:
    using a computer system to perform steps of:
        receiving, by a webserver, an input to initiate generation of a data management request related to an application object, wherein a number of predefined data management operations are configured for the application object;
        responsive to receiving the input, identifying, by the webserver, an application associated with the application object using association information that identifies a number of application objects for the application ; and
        generating, by the webserver, the data management request to initiate the number of predefined data management operations for the application object in the application, wherein all data management requests generated by the webserver comprises a generic format for all application objects.

12. A computer-implemented method to automate data management, the method comprising:
    using a computer system to perform steps of:
        receiving an input to initiate generation of a data management request related to an application object, wherein a number of predefined data management operations are configured for the application object;
        retrieving a number of data management request templates;
        filling the number of data management request templates based on the input to generate a number of data management requests;
        identifying an application associated with the application object using association information that identifies a number of application objects for the application; and
        sending the number of data management requests to initiate the number of predefined data management operations for the application object in the application, wherein data management requests comprise a generic format for all application objects.

13. A data management system, comprising:
    a request server configured to receive an input to generate a number of data management requests related to an application object and identify an appropriate application to perform a number of predefined data management operations configured for the application object; and
    a database server in communication with the request server, configured to store the number of predefined data management operations associated with the application object and the application.

14. The system of claim 13, wherein the number of predefined data management operations stored on the database server comprises association information between the application object and the application.

15. The system of claim 13, wherein the number of predefined data management operations stored on the database server comprises a number of predefined properties associated with the application object.

16. The system of claim 15, wherein the predefined properties associated with the application object comprises at least one of:
   value;
   computed value;
   inherited value;
   new object;
   hidden value;
   duplicate value;
   datasource value; or
   existing object.

17. The system of claim 15, wherein the predefined properties comprise dynamic properties that depend on values of other properties.

18. The system of claim 13, wherein the request server provides a representational state transfer (REST) interface, and wherein the REST interface comprises a plurality of application programming interfaces (API).

19. The system of claim 13, wherein the request server receives the input to initiate the data management requests via a web interface.

20. The system of claim 13, further comprising a number of proxy servers to translate the data management requests into a format acceptable to the application.

21. The system of claim 13, wherein the number of predefined data management operations comprises at least one of:
   data deletion;
   data creation;
   data update;
   data validation; or
   data verification.

22. The system of claim 13, wherein the request server is a web server.

23. The system of claim 13, wherein the database server comprises a number of data management request templates.

* * * * *